United States Patent
Wang et al.

(10) Patent No.: US 9,747,486 B2
(45) Date of Patent: Aug. 29, 2017

(54) DECODING VISUAL CODES

(71) Applicant: A9.com, Inc., Palo Alto, CA (US)

(72) Inventors: Chun-Kai Wang, Mountain View, CA (US); Yu Lou, Stanford, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/282,829

(22) Filed: Sep. 30, 2016

(65) Prior Publication Data

US 2017/0024595 A1    Jan. 26, 2017

Related U.S. Application Data

(63) Continuation of application No. 14/799,327, filed on Jul. 14, 2015, now Pat. No. 9,501,681.

(51) Int. Cl.
*G06K 7/10*     (2006.01)
*G06K 9/36*     (2006.01)
*G06K 7/14*     (2006.01)

(52) U.S. Cl.
CPC ......... *G06K 7/1443* (2013.01); *G06K 7/1417* (2013.01)

(58) Field of Classification Search
USPC ................ 235/462.01–462.09, 494
See application file for complete search history.

(56) References Cited

U.S. PATENT DOCUMENTS

| | | | |
|---|---|---|---|
| 6,360,948 B1 | 3/2002 | Yang | |
| 6,565,003 B1 * | 5/2003 | Ma | G06K 7/10861 235/462.08 |
| 6,612,497 B1 * | 9/2003 | Iida | G06K 7/14 235/462.08 |
| 6,863,218 B2 | 3/2005 | Muramatsu | |
| 7,240,841 B2 * | 7/2007 | Kelley | G06F 17/243 235/376 |
| 7,648,072 B2 | 1/2010 | Yada | |
| 8,596,538 B2 * | 12/2013 | Sun | G06K 7/14 235/462.01 |
| 8,820,643 B1 * | 9/2014 | Lei | G06K 7/1465 235/462.06 |

(Continued)

OTHER PUBLICATIONS

"Non Final Office Action dated Jan. 25, 2016" received in U.S. Appl. No. 14/799,327.

(Continued)

*Primary Examiner* — Tuyen K Vo
(74) *Attorney, Agent, or Firm* — Hogan Lovells US LLP

(57) ABSTRACT

Various algorithms are presented that enable an image of a data matrix to be analyzed and decoded for use in obtaining information about an object or item associated with the data matrix. The algorithms can account for variations in position and/or alignment of the data matrix. In one approach, the image is analyzed to determine a connected region of pixels. The connected region of pixels can be analyzed to determine a pair of pixels, included in the connected region of pixels, that is separated a greatest distance wherein a first pixel and second pixel of the pair of pixels is associated with image coordinates. Using the image coordinates of the pair of pixels, a potential area of the image that includes the visual code can be determined and the potential area can be analyzed to verify the presence of a potential data matrix.

20 Claims, 7 Drawing Sheets

(56) References Cited

U.S. PATENT DOCUMENTS

| | | | |
|---|---|---|---|
| 2004/0026511 A1* | 2/2004 | Cheung | G06K 19/06037 235/462.1 |
| 2005/0121520 A1 | 6/2005 | Yamagushi | |
| 2007/0071320 A1 | 3/2007 | Yada | |
| 2007/0228171 A1 | 10/2007 | Thiyagarajah | |
| 2008/0253608 A1* | 10/2008 | Long | G06K 7/14 382/100 |
| 2010/0155464 A1 | 6/2010 | Swayn | |
| 2010/0155494 A1* | 6/2010 | Quine | G06K 15/1807 235/494 |
| 2011/0290880 A1* | 12/2011 | Cai | G06K 7/14 235/437 |
| 2012/0173347 A1* | 7/2012 | De Almeida Neves | G06K 7/10861 705/16 |
| 2013/0301870 A1* | 11/2013 | Mow | G06T 1/0021 382/100 |
| 2015/0021400 A1* | 1/2015 | Lei | G06K 7/1404 235/462.42 |

OTHER PUBLICATIONS

"Final Office Action dated May 9, 2016" received in U.S. Appl. No. 14/799,327.
"Notice of Allowance dated Jul. 29, 2016" received in U.S. Appl. No. 14/799,327.

* cited by examiner

DECODING VISUAL CODES

This application is a continuation of allowed U.S. application Ser. No. 14/799,327 entitled "DECODING VISUAL CODES," filed Jul. 14, 2015, which is incorporated herein by reference for all purposes.

BACKGROUND

As portable electronic devices offer an ever-increasing amount of functionality, people are using these devices to assist with a greater variety of tasks. As an example, a person in a store might want to obtain information about an item, such as reviews for a book or a price from a retailer of that item. Some applications enable a user to capture an image of a quick response (QR) code on an item, and upload that image to a central server where the image can be analyzed and decoded. Such an approach can require a significant amount of time and bandwidth to upload, and requires an acceptable cellular signal in many instances, which can be difficult to obtain in large brick and mortar stores or other such locations. While the functionality could be loaded onto the device, conventional systems typically require the QR code to be well aligned and positioned in the center of the image, which can make it difficult to decode these images using conventional algorithms, thus requiring a significant amount of processing capacity and power consumption, which might be unavailable or at least undesirable for a user of a small portable device.

BRIEF DESCRIPTION OF THE DRAWINGS

Various embodiments in accordance with the present disclosure will be described with reference to the drawings, in which.

DETAILED DESCRIPTION

Figure 1A:
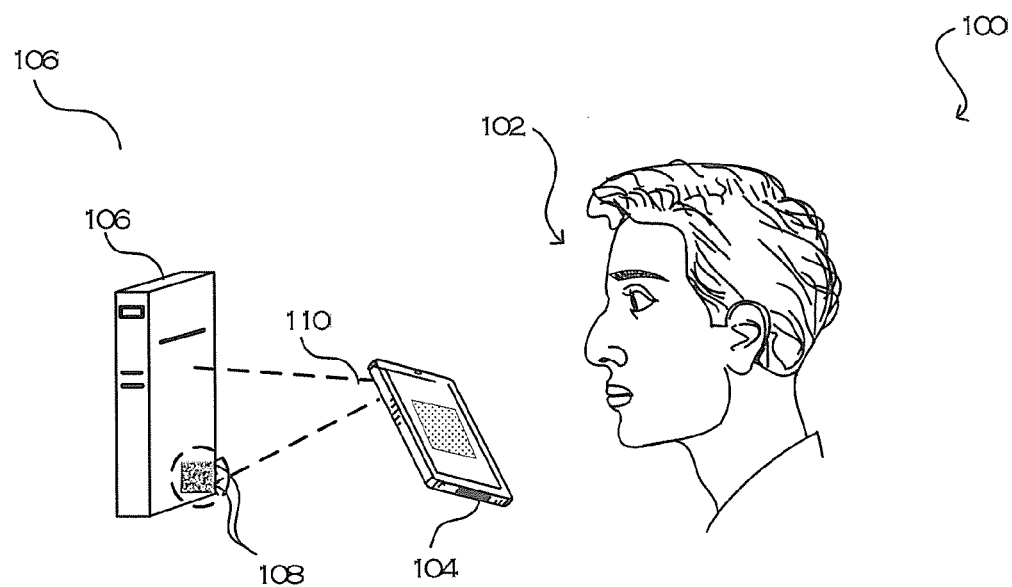
FIGS. 1A and 1B illustrate an example situation wherein a user captures an image of a visual code using a portable electronic device, which is then displayed on the electronic device.

Systems and methods in accordance with various embodiments of the present disclosure may overcome one or more of the aforementioned and other deficiencies experienced in conventional approaches to obtaining information from a visual code such as a data matrix. In particular, various embodiments provide for recognizing and decoding data matrices from a captured image that are positioned at an arbitrary position and/or orientation in the image. An image including a representation of a data matrix can have been captured using an image capture element of any appropriate device, such as a digital camera of a portable computing device. In some situations, the data matrix may be positioned such that it is difficult to align and orient the data matrix in the center or other appropriate area of the image. Further, a device such as a tablet computer or smart phone often is held in a user's hand, and thus might be moving slightly while capturing the image, which can make it difficult to align and orient the data matrix. Further still, any of a number of other reasons might lead to an arbitrary position and/or orientation of the data matrix in the captured image, which may make it not possible or at least difficult for conventional data matrix reading algorithms to provide an accurate result in at least some cases.

Accordingly, a decoding process in accordance with at least one embodiment includes analyzing an image to identify a data matrix regardless of the data matrix's position and/or orientation in the image. In one such approach, the image is analyzed to determine a connected region of pixels. The connected region of pixels can be analyzed to determine a pair of pixels, included in the connected region of pixels, that is separated a greatest distance wherein a first pixel and second pixel of the pair of pixels is associated with image coordinates. Using the image coordinates of the pair of pixels, a potential area of the image that includes the visual code can be determined and the potential area can be analyzed to verify the presence of a potential data matrix. In the situation where the presence of the data matrix is verified, the data matrix in the area is decoded. Various other approaches and implementations can be used as well as discussed elsewhere herein.

In accordance with various embodiments, algorithms can also be configured to handle variations of specific data matrix standards, as well as multiple data matrix formats. At least some of these algorithms also can be executed quickly enough, and with a minimal amount of resources, such that in at least some embodiments the entire data matrix reading and decoding process can be performed on the portable computing device. In other embodiments, a captured image or other such information can be sent to a remote server or other device for analysis, which then can return information relating to the barcode to the device.

Various other applications, processes and uses are presented below with respect to the various embodiments.

FIG. 1A illustrates an example environment 100 wherein a user 102 is operating an electronic device 104 that includes at least one image capture element. In this example, the user 102 locates an item or object of interest 106. If the user wants to obtain information about the item, such as a description or pricing information, the user 102 can manipulate the electronic device 104 until a viewable area 110 of a camera of the device includes a data matrix 108 positioned on, attached to, or otherwise associated with, the item of interest 108. In accordance with various embodiments, a data matrix is a two-dimensional matrix barcode consisting of black and white "cells" or modules arranged in either a square or rectangular pattern. The information to be encoded can be text or numeric data. In this example, the data matrix is composed of two solid adjacent borders in an "L" shape (called the "finder pattern") and two other borders consisting of alternating dark and light "cells" or modules (called the "timing pattern"). Within these borders are rows and columns of cells encoding information.

Figure 1B:
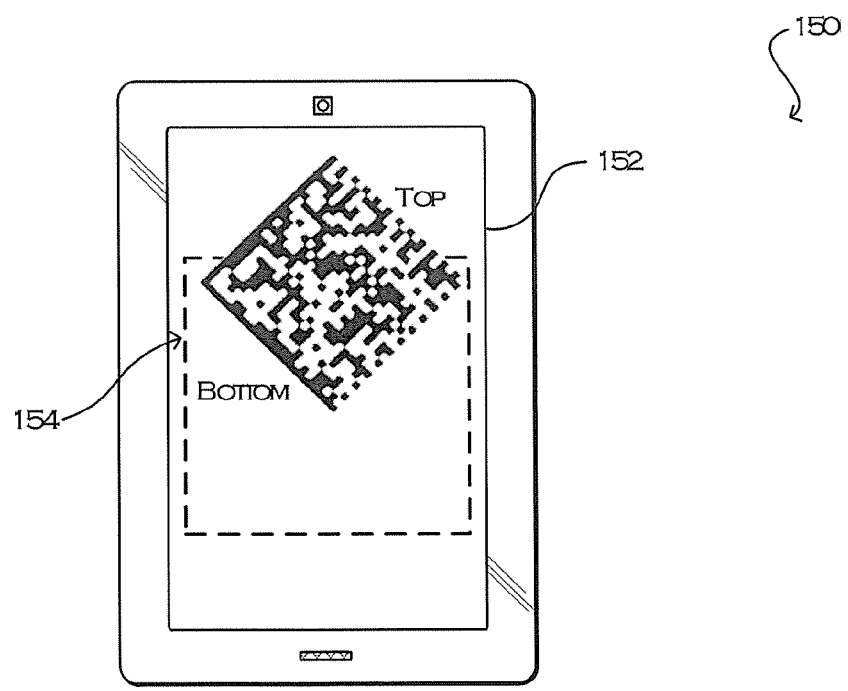

FIG. 1B illustrates an example of the data matrix 154 when displayed as part of the captured image on a display element 152 of an electronic device 150. As described, some applications enable a user to capture an image of the data matrix to analyze and decode the data matrix. However, such conventional approaches typically require the data matrix to be aligned and positioned in the center of the image before the data matrix can be decoded. In some situations, such as the one shown in FIG. 1B, a bounding window to which the data matrix is to be aligned can be provided to help assist the user in capturing a useful image. The user can attempt to manipulate the electronic device until a viewable area of a camera of the device includes the data matrix positioned on, attached to, or otherwise associated with, the item of interest is properly centered and aligned. However, in some situations, this process can be difficult and time consuming, which can be frustrating to a user where the user. As shown in FIG. 1B, the data matrix is not properly oriented or aligned as the top of the data matrix is titled clockwise and the data matrix is partially positioned outside the bounding window. In this situation, the device may not be able to decode the data matrix. Accordingly, various embodiments provide for recognizing and decoding data matrices from a captured image that are positioned at an arbitrary position and/or orientation in the image.

Figure 2A:
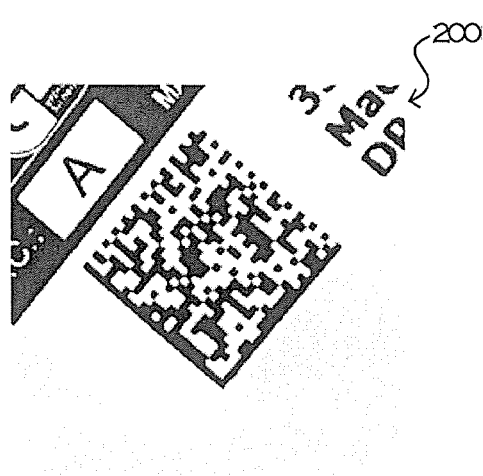
FIGS. 2A-2K illustrate an example of analyzing visual codes in accordance with various embodiments.

FIGS. 2A-2H illustrate an example approach for identifying visual codes from a captured image that are positioned at an arbitrary position and/or orientation in the image. FIG. 2A illustrates a view 200 of the example visual code displayed on the device in FIG. 1B. In this example, the visual code is a data matrix (e.g., a QR code). The image includes other items other than the data matrix. As described, if a user wants to obtain information about an item, such as a description or pricing information, the user can manipulate the electronic device until a viewable area of a camera of the device includes the data matrix positioned on, attached to, or otherwise associated with, the item of interest. In some situations, the image can be downloaded or obtained in a way other than capturing an image of the item of interest.

The data matrix is a two-dimensional matrix barcode consisting of black and white "cells" or modules arranged in either a square or rectangular pattern. Depending on the coding used, a "light" cell represents a 0 and a "dark" cell is a 1, or vice versa. As used herein, the black and white squares will be referred to as modules rather than pixels to differentiate between on-screen pixels and the black and white squares of the data matrix. For example, a data matrix may be 21 modules by 21 modules, even if it takes up 42 by 42 pixels on a computer screen, or 105×105, and so on. A data matrix can include a number of function patterns. A function pattern can be, for example, shapes placed in specific areas of the data matrix to ensure that data matrix scanners can correctly identify and orient the data matrix for decoding.

Figure 2B:
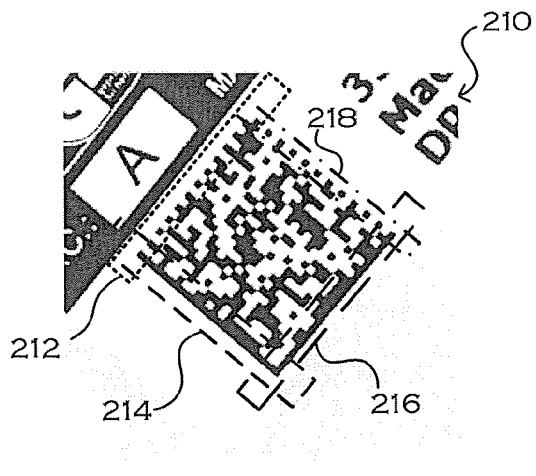

Example function patterns are illustrated in FIG. 2B. Example 210 of FIG. 2B illustrates a finder pattern (214, 216) and a timing pattern (212, 218). The finder pattern can be used to locate and orient the data matrix while the timing pattern provides a count of the number of rows and columns in the data matrix. In this example, the finder pattern consists of two solid adjacent borders in an "L" shape, while the timing pattern consists of adjacent borders with alternating dark and light cells. As should be understood, other data matrix formats can utilize different patterns as known in the art. As should be further understood, other function patterns, in addition to or instead of those described, can be included in the data matrix. Example patterns include finder patterns, separators, alignment patterns, dark modules, among others.

Once the image is obtained, a detection component or other such component(s) can attempt to determine whether the data matrix associated with the item of interest is identifiable. In accordance with various embodiments, the image can be binarized to generate a binarized image. Those skilled in the art will understand that in certain embodiments, the image is not binarized, and that the approaches described herein can be performed on various types of images of various formats. A binary image is a digital image that has only two possible values for each pixel. Typically the two colors used for a binary image are black and white though any two colors can be used. As would be understood to one skilled in the art, any one of a number of image binarizing approaches can be used to generate the binarized image. One approach is to use thresholding to convert a grayscale image into a binary black and white image (such as by setting any pixels in the image above a given threshold to black and all others to white).

The binarized image (and in certain examples the obtained image (i.e., the captured or downloaded image)) can be analyzed using at least one connected-component analysis approach to determine a plurality of connected-components. In accordance with various embodiments, connected-component analysis, connected-component labeling, blob extraction, region labeling, blob discovery, region extraction), among other like approaches, are algorithmic applications of graph theory, where subsets of connected-components are uniquely labeled based on a given heuristic. In one such approach, the computing device scans an image and groups its pixels into components based on pixel connectivity, i.e. all pixels in a connected-component share similar pixel intensity values and are in some way connected with each other. Once all groups have been determined, each pixel is labeled with a graylevel or a color (color labeling) according to the component it was assigned to. In this way, connected-component analysis works by scanning an image, pixel-by-pixel (from top to bottom and left to right) in order to identify connected pixel regions, i.e. regions of adjacent pixels which share the same set of intensity values.

An example connected-component is a subgraph in which any two vertices are connected to each other by paths, and which is connected to no additional vertices in the supergraph. Those skilled in the art will understand that given a graph $G=(V,E)$, where V is a set of vertices (of size n) and E is a set of edges (of size m), the connected-components of G are the sets of vertices such that all vertices in each set are mutually connected (reachable by some path), and no two vertices in different sets are connected.

The connected-components are compared to a threshold connected-component size. Connected-components less than the threshold size are discarded or otherwise processed in a different manner. In accordance with an embodiment, the threshold connected-component size can correspond to, for example, a number of connected pixels. In this way, a connected-component having less than a threshold number of connected pixels is discarded or processed in a different manner. In another example, the threshold size can correspond to the length of the connected-component. As will be apparent to a person of reasonable skill in the art, the length of the connected-component can be determined in a number of different ways. In one such way, a starting pixel in the image is selected. From the starting pixel, each node is scanned until all nodes are exhausted. This is repeated until all connected-components are determined.

Figure 2C:
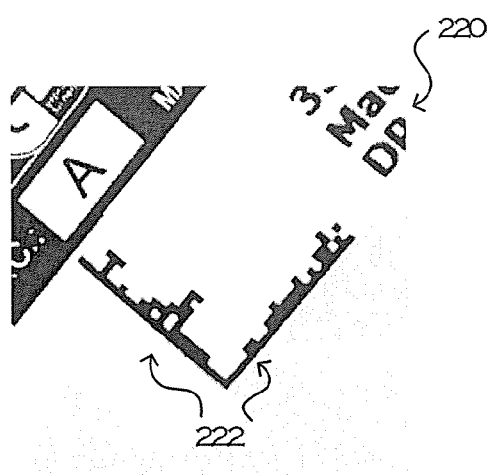
Figure 2D:
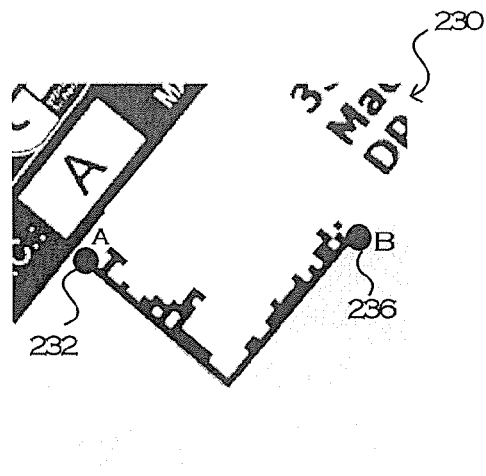
Figure 2E:
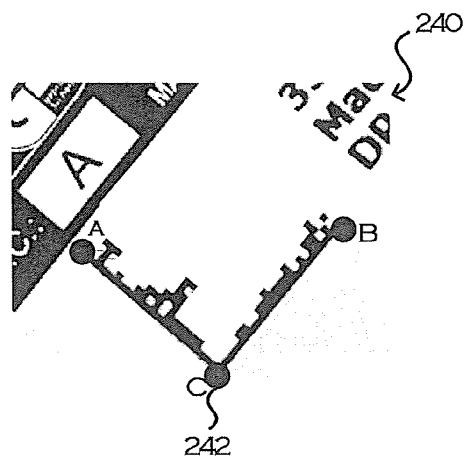

Once the connected-components are compared to the threshold size, one or more connected-components will remain. Example 220 of FIG. 2C illustrates one such connected-component 222. It should be noted that for purposes of explanation, FIG. 2C illustrates one connected-component. As would be understood to one skilled in the art, in various embodiments, a plurality of components that meet the threshold size can be identified. It should also be understood that although only connected-component 222 is shown, this is merely for purposes of explanation, and the not shown portions of the data matrix are still used in the processing.

In this example, connected-component 222 is analyzed to determine two pixels, pixel A and pixel B, that are the furthest distance apart on connected-component 222. As shown in example 230 of FIG. 2D, the two pixels correspond to points 232 and 236, which for the data matrix illustrated and assuming the image undergoes distortion less than a threshold amount, typically corresponds to the two ends of the "L" shape.

In accordance with an embodiment, determining two pixels that are the furthest distance apart on the connected-component can include, for example, determining a plurality of distance measurements for each pixel in connected-component 222, where each distance measurement of the plurality of distance measurements corresponds to a distance between a pair of pixels in connected-component 222. For example, starting with an initial pixel in the connected-component, the distance from the initial pixel to each of the other pixels can be determined. This process can be repeated from each pixel in the connected-component and will result in a plurality of distances. Thereafter, a greatest distance can be selected from the plurality of distances. The greatest distance is associated with a first pixel (pixel A) and a second pixel (pixel B) in connected-component 222, the first pixel having a first location on the image and the second pixel having a second location on the image. The first location and the second location, or any pixel location, should be understood to be defined by the x, y coordinates of each pixel on the image. As would be understood to one skilled in the art, any one of a number of digital image processing algorithms can be used to measure the Euclidean distance between pixels in an image.

Once the two pixels, pixel A and pixel B, that are the furthest distance apart are determined, a third pixel, pixel C, is determined based on the location of pixel A and pixel B on the image. The location of pixel C can be determined by, for example, determining a pixel with a location that is the largest sum of distances to the location of pixel A and pixel B. As shown in example 240 of FIG. 2E, point C can correspond to point 242, which for the data matrix illustrated and assuming the image undergoes distortion less than a threshold amount, typically corresponds to the pixel located at the corner of the "L."

In accordance with an embodiment, determining the location of pixel C can include, for example, determining, for each pixel in connected-component 222, a sum of distance from a pixel in the connected-component to the pixel A and to pixel B. The process is repeated for each pixel in the connected-component, and the pixel corresponding to the largest sum of distance is pixel C. In accordance with various embodiments, pixel A, B, and C will each have a location on the image. As would be understood to one skilled in the art, any one of a number of ways can be used to express a location on an image In one such approach, the location of a pixel can be expressed using pixel indices. For example, the image can be treated as a grid of discrete elements, ordered from top to bottom and left to right. For pixel indices, the row increases downward, while the column increases to the right. Pixel indices are integer values, and range from 1 to the length of the row or column. As an example, the data for the pixel in the fifth row, second column is stored in the matrix element (5,2).

Based at least in part on the locations of pixels A, B, and C, a location of a fourth pixel, pixel D, can be determined.

Figure 2F:
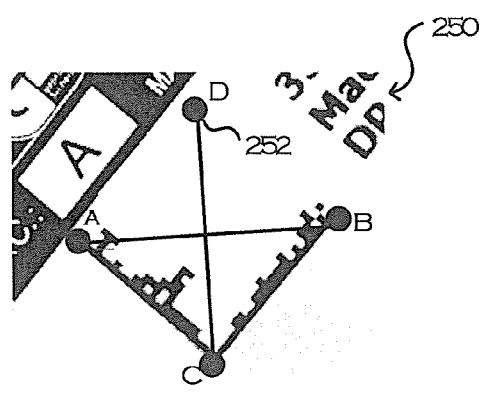

As illustrated in example 250 of FIG. 2F, pixel D can correspond to point 252. The location of pixel D can be determined, for example, using the geometric relationship between pixels A, B, and C. For example, assuming the locations of A, B, C for a portion of a parallelogram, the location of pixel D can be determined based on the geometric properties of a parallelogram. Various other image analysis approaches to determine the geometric relationship between pixel locations on an image can be used as well as should be apparent to one of ordinary skill in the art in light of the present disclosure.

An area or region of interest can be determined using the locations of pixels A, B, C, and D, where the region of interest potentially contains the data matrix. In this way, in an image that identified one or more regions of interest, each region would include a candidate data matrix. In accordance with various embodiments, a region of interest (ROI), for example, can be an area of an image to focus image analysis.

A binary mask can be used to define the region of interest. As shown in example 260 of FIG. 2G, a mask 262 is formed using the locations of pixels A, B, C, and D. Once the binary mark is generated, an arbitrary image matrix can be specified. In this example, the pixel values of the image corresponding to binary mask can be the original pixel values, and all other pixel values can be some other pixel value. As shown in example 270 of FIG. 2H, the region of interest 272 includes the pixel values of the data matrix. The pixel values outside 276 the data matrix can be some other value (e.g., zero). In various embodiments, to ensure the region of interest includes the data matrix, the region of interest can be dilated by certain amount, as shown by region 274. The amount can be, for example, 1-3 pixels.

The image can be analyzed using at least one image processing algorithm to locate the outermost pixels. As shown in example 280 of FIG. 2I, the outermost pixels are in regions 282, 284, 286, and 288. For explanation purposes, only pixels in those regions are displayed and pixels outside those regions are not shown. Locating the outermost pixels can include, for example, running scan lines in a particular direction (e.g., outside the data matrix towards the inside of the data matrix in a particular direction) to locate the outermost pixels within the region of interest. In accordance with an embodiment, this can include, for example, scanning the first image in a first direction to determine a first set of pixels, the first set of pixels being positioned along a first path between the first image coordinates and the second image coordinates; scanning the image in a second direction to determine a second set of pixels, the second set of pixels being positioned along a second path between the first image coordinates and the fourth image coordinates; scanning the image in a third direction to determine a third set of pixels, the third set of pixels being positioned along a third path between the fourth image coordinates and the third image coordinates, scanning the image in a fourth direction to determine a fourth set of pixels, the fourth set of pixels being positioned along a fourth path between the third image coordinates and the second image coordinates; and determining a first intersection point, a second intersection point, a third intersection point, and a fourth intersection point based at least in part on an intersection of the first set of pixels, the second set of pixels, the third set of pixels, and the fourth set of pixels.

Figure 2G:
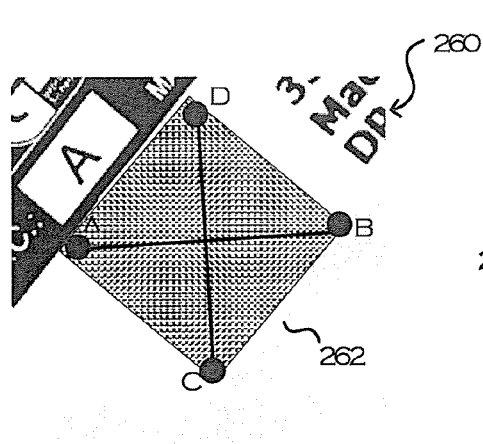

A scan line can be, for example, a single row of pixels in the image. In this example, the image can be divided into a plurality of scan lines (i.e., rows of pixels), and the pixels can analyzed to located the outermost pixels within the region of interest. For example, based on the pixels value at each location, a transition from a first pixel value (e.g., 1) to a series of a second pixel value (e.g., 0) can be determined. The last pixel value before the transition can be the outermost pixel of the image at that location. This can be repeated for each scan line of the image to determine the outermost pixels within the region of interest. It should be noted that any one of a number of approaches can be used to determine the outermost pixels, and any approaches described are for purposes of explanation. As shown in FIG. 2G, the outermost pixels correspond to the solid adjacent borders, the "L" shape, and the two other borders consisting of the alternating dark and light modules.

Figure 2H:
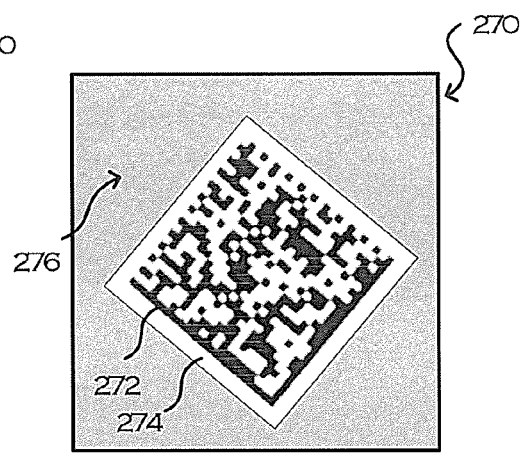
Figure 2I:
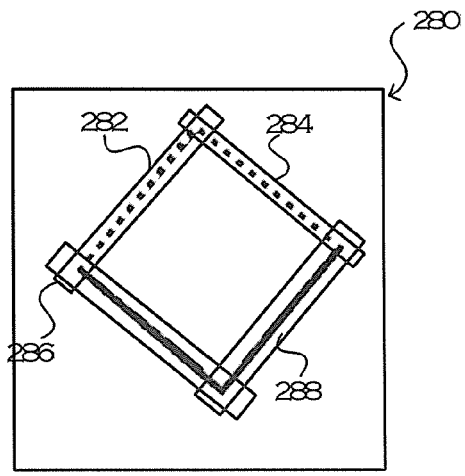
Figure 2J:
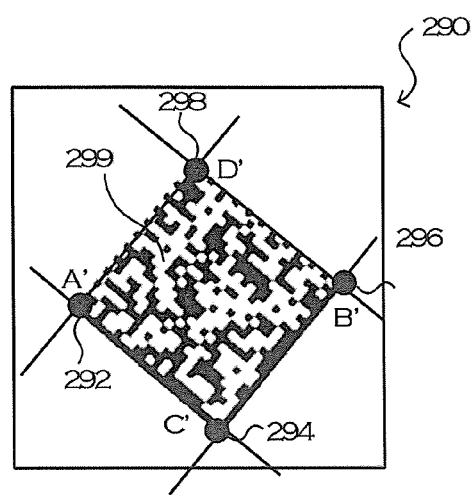

The outermost pixels can be divided into four groups. For example, as shown in example 280 of FIG. 2J, the outermost pixels are divided into four groups by lines AD, DB, BC, and CA. Using at least one line fitting algorithm, a straight line can be determined for each group of pixels. As would be understood to one skilled in the art, line fitting is the process of constructing a line, curve, or mathematical function, that has the best fit to a series of data points. Line fitting can involve either interpolation, where an exact fit to the data is required, or smoothing, in which a "smooth" function is constructed that approximately fits the data. As shown in FIG. 2H, the four straight lines interest at four points, A', B', C', and D'. The four points (292, 294, 296, and 298) correspond to pixels that are associated with pixels locations in one of the four groups. In accordance with various embodiments, the four points can represent corners of the candidate data matrix 299.

For each candidate data matrix, at least two tests can be performed such as an aspect ratio test and a timing pattern test. In this example, there is one candidate data matrix. It should be noted that various other tests can be used to verify whether a data matrix exists, as in known to those skilled in the art.

The aspect ratio test can be used to verify a ratio of, for example, a length and width of the candidate data matrix. If the ratio of the length and width of the candidate data matrix meet an aspect ratio threshold within a certain deviation, the test is successfully passed.

For example, a ratio of the length of the segment formed by A' and D' to the length of segment A' and C' can be determined and the ratio can be compared to an aspect ratio threshold (e.g., 1.0). It should be noted that in this example the geometric shape of the candidate data matrix corresponds to a square. However, as would be understood to those skilled in the art, the geometric shape can corresponds to other shapes, as may include a rectangle, etc. In accordance with various embodiments, there can be one or more aspect ratio thresholds. For example, a first threshold can be 1.0 and a second threshold can be 0.50. The determined ratio of the candidate data matrix can be compared to each of these aspect ratio thresholds. If the ratio of the candidate data matrix meets at least one of these thresholds within a certain deviation, the aspect ratio test is passed.

The timing pattern test, or other like test, can be used to verify a particular pattern represented in the candidate data matrix. If the particular pattern is identified and the aspect ratio test is passed, it can be assumed the region of interest includes a data matrix. Thereafter the data matrix can be processed, as may include decoding the data matrix, providing the data matrix to another computing device, etc.

In this example, the borders along lines AD' and DB' can be analyzed to identify a black/white pixel ratio. The pixel ratio for each border (e.g., the pixel ratio for line AD' and the pixel ratio for line DB') can be compared to a pixel ratio threshold. As example pixel ratio threshold can be, for example, 0.5. In this example, if the first ratio associated with line AD' passes the pixel ratio test, and the second ratio associated with line DB' passes the pixel ratio test, the timing pattern test can be considered passed. In various embodiments, each border can be analyzed. This can include analyzing borders AD', DB', BC', and CA'. If at least two adjacent borders are associated with a pixel ratio that at least meets the pixel ratio test, then the time pattern test is passed. It should be noted that various other pixel ratio thresholds can be used as well as other requirements where more or fewer borders must pass the pixel ratio test.

Figure 2K:
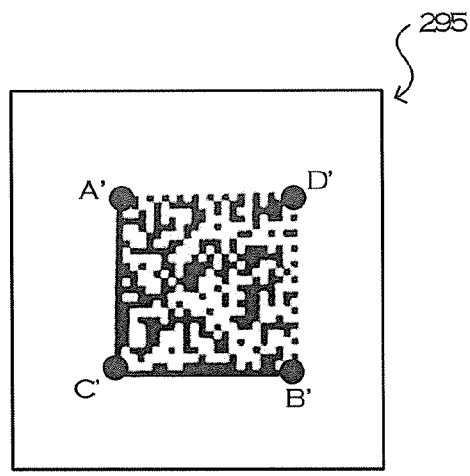

In the situation where both the aspect ratio test and the timing pattern test are passed, it can be assumed the region of interest includes a valid data matrix. Using the location of points A', B', C', and D' the area of interest that includes the data matrix can be rectified. That is, given a first view of the data matrix from a first viewing position and viewing angle as seen in FIG. 2A, a second view of the data matrix can be determined. Such a view is illustrated in example 295 of FIG. 2K, where the region of interest is rectified to illustrate the second view of the data matrix. In the second view, the data matrix is appropriately oriented for a particular decoder component. In accordance with an embodiment, the rectified region of interest can be cropped from the image and the cropped region of interest that includes the data matrix can be provided to a decoding component. In another example, coordinate information describing the rectified location of the region of interest on the image can be determined and the image and the coordinate information can be provided to a decoding component. In certain embodiments, various image processing approaches can be performed before providing information identifying the data matrix or before providing the data matrix to a decoding component or process.

Accordingly, in accordance with various embodiments, approaches enable a person in a store who wants to obtain information about an item, such as reviews for a book or a price from a retailer of that item can use an applications to capture an image of a quick response (QR) code on the item, and upload that image to a central server (or process the image locally on the device) where the image can be analyzed and decoded regardless that data matrix may be positioned at an arbitrary position and/or orientation in the image.

Figure 3:
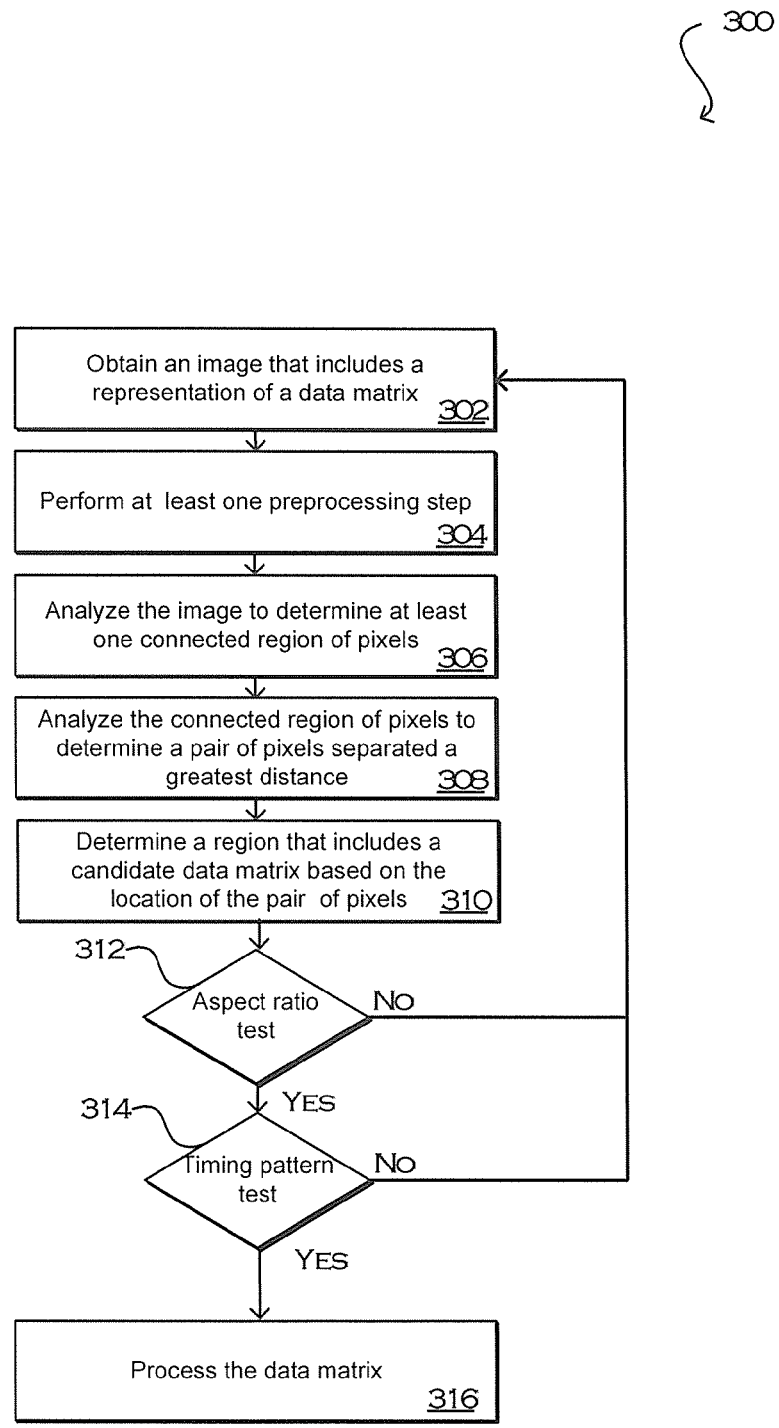
FIG. 3 illustrates an example process for decoding a visual code from an image in accordance with various embodiments.

FIG. 3 illustrates an example process for identifying visual codes from a captured image that are positioned at an arbitrary position and/or orientation in the captured image in accordance with various embodiments. In this example, an image is obtained 302 that allegedly contains at least one visual code. As discussed, the image can be captured or uploaded by a user, or otherwise obtained. As described, in some situations, the data matrix may be positioned such that it is difficult to align and orient the data matrix in the center or other appropriate area of the image. Further, a device such as a tablet computer or smart phone often is held in a user's hand, and thus might be moving slightly while capturing the image, which can make it difficult to align and orient the data matrix. Further still, any of a number of other reasons might lead to an arbitrary position and/or orientation of the data matrix in the captured image, which may make it not possible or at least difficult for conventional data matrix reading algorithms to provide an accurate result in at least some cases.

In at least some embodiments, one or more preprocessing steps are performed 304 for the obtained image. For example, the image to be analyzed can be converted to a binarized or grayscale (or other monochrome) image, color normalization can be performed, and other such image preprocessing can be performed as desired. In accordance with an embodiment, the binarized image can include a plurality of pixels ("image elements"), each pixel of the plurality of pixels being associated with one of a first pixel value or a second pixel value. As described, the pixels values can be, for example 1 and 0.

The image is analyzed 306 to determine at least one connected region of pixels. A connected region, path of adjacent pixels, connected component, can be determined by, for example, using a connected-component detection algorithm. The connected region of pixels can be analyzed 308 to determine a pair of pixels, included in the connected region of pixels, that is separated a greatest distance, wherein a first pixel and second pixel of the pair of pixels is associated with image coordinates. Using the image coordinates of the pair of pixels, a region (or area) of the image that includes a potential (or candidate) data matrix can be determined 310. For example, a third pixel in the connected region of pixels can be identified, where the third pixel is associated with a third location that is a furthest location from both of the first location and the second location than any pixel in the connected region of pixels. Identifying the third pixel can include, for example, determining, for each pixel in the path of adjacent pixels, a sum of distance to the first location and the second location, and selecting a largest sum of distance, the largest sum of distance corresponding to the third pixel. A fourth location of a fourth pixel can be estimated using a geometric relationship between the first location, the second location, and the third location and a region of interest can be determined based at least in part on the first location, second location, third location, and fourth location.

The region of interest can be analyzed to verify that the region includes the data matrix. The verification stage can include at least two tests, an aspect ratio test 312 and a timing pattern test 314. The aspect ratio test can be used to verify a ratio of, for example, a length and width of the candidate data matrix. If the ratio of the length and width of the candidate data matrix meet an aspect ratio threshold within a certain deviation, the test is successfully passed and the timing pattern test is performed. The timing pattern test, or other like test, can be used to verify a particular pattern represented in the candidate data matrix. If the particular pattern is identified and the aspect ratio test is passed, it can be assumed the region of interest includes a data matrix. In the situation where the presence of the data matrix is verified, the data matrix can be processed 316. For example, the region of interest can be cropped from the image and the cropped region of interest that includes the data matrix can be provided to a decoding component. In another example, coordinate information describing the location of the region of interest on the image can be determined and the image and the coordinate information can be provided to a decoding component. In certain embodiments, various image processing approaches can be performed before providing information identifying the data matrix or before providing the data matrix to a decoding component or process. In at least some embodiments, the decoding process can be aborted if either of the tests fail. In this situation the process repeats with a different connected region of pixels.

Using processes discussed and suggested herein, a computing device having access to a decoding algorithm can capture and analyze an image of a data matrix, in order to determine information encoded in the data matrix. This information then can be used for any of a number of purposes as discussed elsewhere herein. In one example, a user might see a product or item of interest, such as a book, and might take a picture of a data matrix on the cover of the book in order to obtain information about the book, such as related books, user reviews, or other such information. The user can utilize any appropriate image capture element on the device, such as a digital still or video camera.

In some cases, a process in accordance with a given embodiment might not provide acceptable accurate results due at least in part to some aspect of the data matrix and/or captured image. In at least some embodiments, the identifying process can continue with additional steps to attempt to find a match while accounting for a number of potential aspects or issues with the captured information. For example, the process might perform additional steps to attempt to handle other barcode formats, such as UPC-E or EAN-8. The process also might attempt to correct for any noise in a central set of rows or other portion of the image, such as where there were specular reflections in the captured image or the data matrix was damaged in some way. The process might also attempt to address the fact that the data matrix might be placed on a curved or other non-flat surface, such as where the data matrix is on a bottle or can.

For other data matrix formats, many of the steps or approaches described above can be applied as well. In some embodiments, the process can first be run for a most common data matrix format, and then can be re-run for each of a number of other less common formats until a match is found or it is determined that the image cannot be decoded. In other embodiments, certain steps of the process can be performed multiple times for different formats, such that the entire process does not have to be repeated in sequence for each potential format until a match is found. Similarly, when favorable results cannot be obtained using a given connected-component, additional connected-component can be analyzed for the same image. These additional connected-component attempts can be done serially as well, or multiple connected-components can be analyzed at the same time in order to decrease the average result time, although such an approach would also increase the average amount of resources needed to find a result Similar additional processing can be required to address the potential for a curved data matrix. Fortunately, the processes described herein can be performed quickly, such that multiple variations of the data matrix decoder can be executed concurrently in order to attempt to capture any anticipated variation. Various combinations of the processes can be utilized for each incoming image to attempt to obtain the most accurate data matrix results.

Figure 4:
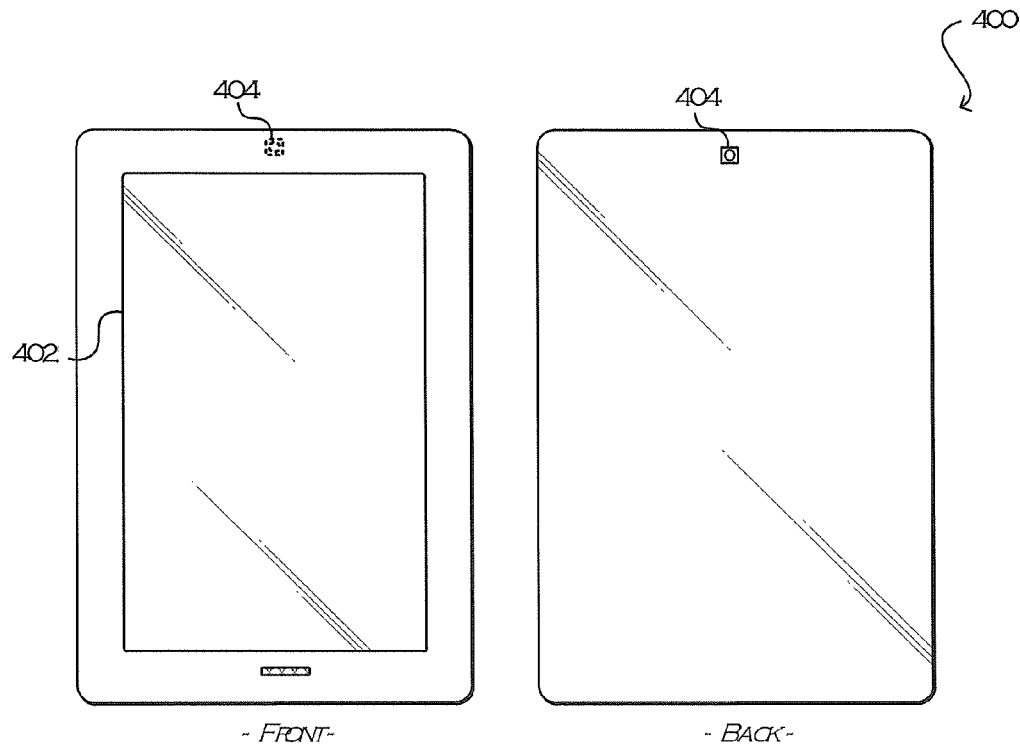
FIG. 4 illustrates front and back views of an example device that can be used in accordance with various embodiments.

FIG. 4 illustrates an example of a computing device 400 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 400 has a display screen 402, which under normal operation will display information to a user facing the display screen (e.g., on the same side of the computing device as the display screen). The computing device in this example can include one or more image capture elements, in this example including one image capture element 404 on the back side of the device, although it should be understood that image capture elements could also, or alternatively, be placed on the sides or corners of the device, and that there can be any appropriate number of capture elements of similar or different types. Each image capture element 404 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 5:
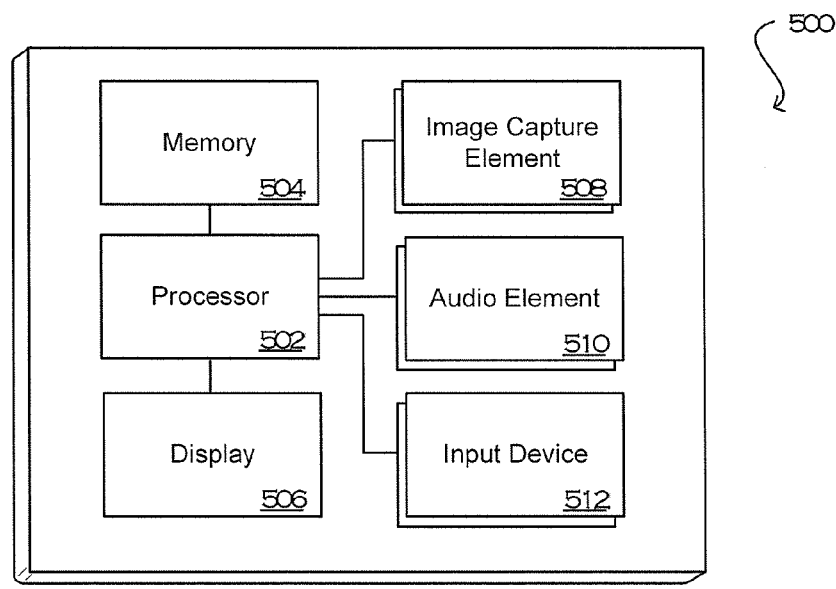
FIG. 5 illustrates an example configuration of components of a device such as that described with respect to FIG. 4.

FIG. 5 illustrates a set of basic components of a computing device 500 such as the device 400 described with respect to FIG. 4. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the processor 502, the same or separate storage can be used for images or data, a removable memory can be available for sharing information with other devices, and any number of communication approaches can be available for sharing with other devices. The device typically will include some type of display element 506, such as a touch screen, electronic ink (e-ink), organic light emitting diode (OLED) or liquid crystal display (LCD), although devices such as portable media players might convey information via other means, such as through audio speakers or another audio element 510. As discussed, the device in many embodiments will include at least one image capture element 508, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one additional input device 512 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 6:
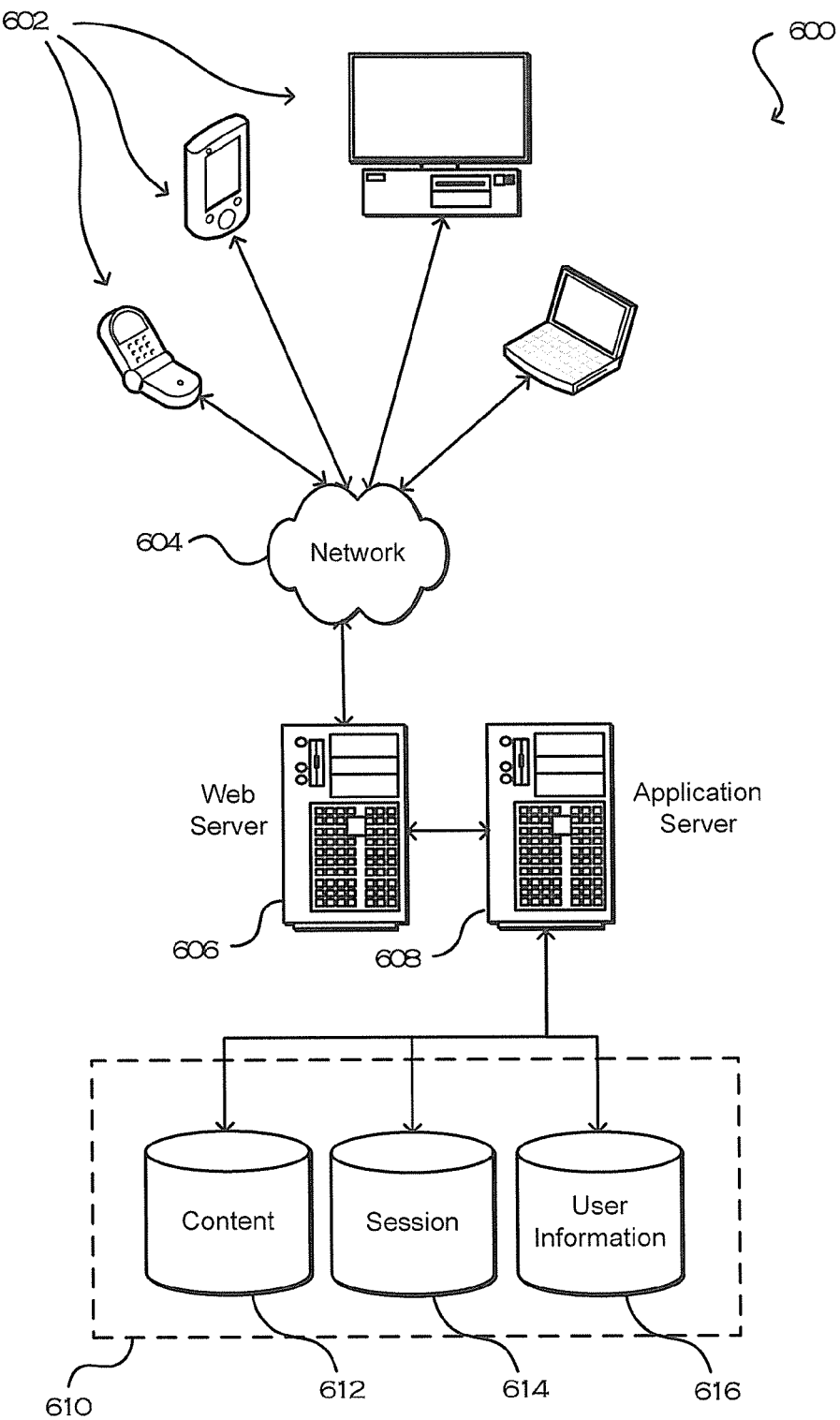
FIG. 6 illustrates an example environment in which various aspects of the various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a computing device processor;
   a memory device including instructions that, when executed by the computing device processor, cause the computing device to:
   obtain an image of a visual code;
   analyze the image to determine a connected region of pixels of a plurality of pixels;
   determine a first pixel of the connected region of pixels associated with first pixel coordinates and a second pixel associated with second pixels coordinates;
   determine an area of the image that includes the visual code based at least in part on the first pixel coordinates and the second pixel coordinates;
   determine a plurality of borders associated with the area;
   analyze the plurality of borders using a first verification test and a second verification test; and
   verify the area includes the visual code based at least in part on the first verification test and the second verification test.

2. The computing device of claim 1, wherein the first pixel and the second pixel are part of a pair of pixels of the connected region of pixels, and wherein the pair of pixels is separated a greatest distance of the connected region of pixels.

3. The computing device of claim 2, wherein the instructions when executed further enable the computing device to:
   for each pixel in the connected region of pixels,
   determine a distance measurement to each pixel in the connected region of pixels to generate a plurality of distance measurements; and
   select the pair of pixels associated with a greatest distance measurement from the plurality of distance measurements.

4. The computing device of claim 1, wherein the instructions when executed to analyze the image further enable the computing device to:
   convert the image to a binarized image, the binarized image including a plurality of pixels, each pixel of the plurality of pixels being associated with one of a first pixel value or a second pixel value; and
   analyze the binarized image using one of a connected-component analysis algorithm, a blob extraction algorithm, a region labeling algorithm, a blob discovery algorithm, or a region extraction algorithm to identify the connected region of pixels.

5. The computing device of claim 1, wherein the instructions when executed to convert the image further enable the computing device to:
   normalize color values for each color channel of each pixel to a value between 0 and 1.

6. The computing device of claim 1, wherein the instructions when executed to determine the area of the image further enable the computing device to:
   for each pixel in the connected region of pixels,
   determine a first distance measurement to the first pixel coordinates,
   determine a second distance measure to the second pixel coordinates,
   determine a sum of the first distance measure and the second distance measure to generate a plurality of distance sums, and
   select a greatest distance sum of the plurality of distance sums, the greatest distance sum being associated with a third pixel associated with third pixel coordinates in the connected region of pixels; and
   estimate fourth pixel coordinates of a fourth pixel using a geometric relationship between the first pixel coordinates, the second pixel coordinates, and the third pixel coordinates.

7. The computing device of claim 6, wherein the instructions when executed further enable the computing device to:
   scan the plurality of pixels in a first direction to determine a first set of pixels, the first set of pixels being positioned along a first path between the first pixel coordinates and the second pixel coordinates;
   scan the plurality of pixels in a second direction to determine a second set of pixels, the second set of pixels being positioned along a second path between the first pixel coordinates and fourth pixel coordinates;
   scan the plurality of pixels in a third direction to determine a third set of pixels, the third set of pixels being positioned along a third path between the fourth pixel coordinates and the third pixel coordinates,
   scan the plurality of pixels in a fourth direction to determine a fourth set of pixels, the fourth set of pixels being positioned along a fourth path between the third pixel coordinates and the second pixel coordinates; and
   determine a first intersection point, a second intersection point, a third intersection point, and a fourth intersection point based at least in part on an intersection of the first set of pixels, the second set of pixels, the third set of pixels, and the fourth set of pixels.

8. The computing device of claim 1, wherein the instructions when executed further enable the computing device to:
   decode the visual code.

9. The computing device of claim 8, wherein the instructions, when executed to verify that the area includes the visual code using the first verification test further enable the computing device to:
   determine a first segment and a second segment of the area;
   determine a first pattern of pixels for the first segment;
   determine a second pattern of pixels for the second segment; and
   determine that the first pattern of pixels and the second pattern of pixels satisfies a ratio of first pixels values to second pixel values.

10. The computing device of claim 8, wherein the instructions, when executed to verify that the area includes the visual code using the second verification test further enable the computing device to:
    determine a geometric shape of the area based at least in part on the plurality of borders of the area, the geometric shape having a length and a width;
    determine a ratio of the length and the width; and
    determine that the ratio meets at least one aspect ratio threshold.

11. The computing device of claim 8, wherein the instructions, when executed to decode the visual code further enable the computing device to:
    crop the potential area from the image to generate a cropped image that includes the visual code; and
    provide the visual code to a decoding component.

12. The computing device of claim 8, wherein the instructions, when executed to decode the visual code further enable the computing device to:
  determine coordinate information describing the area of the image; and
  provide the image and the coordinate information to a decoding component.

13. A method, comprising:
  obtaining an image of a visual code;
  analyzing the image to determine a connected region of pixels of a plurality of pixels;
  determining a first pixel of the connected region of pixels associated with first pixel coordinates and a second pixel associated with second pixels coordinates;
  determining an area of the image that includes the visual code based at least in part on the first pixel coordinates and the second pixel coordinates;
  determining a plurality of borders associated with the area;
  analyzing the plurality of borders using a first verification test and a second verification test; and
  verifying the area includes the visual code based at least in part on the first verification test and the second verification test.

14. The method of claim 13, further comprising:
  for each image element in the connected region of pixels, determining a distance measurement to each of the pixels in the connected region of pixels to generate a plurality of distance measurements; and
  selecting a pair of pixels associated with a greatest distance measurement from the plurality of distance measurements.

15. The method of claim 13, wherein determining the area of the image further includes:
  for each image element in the connected region of pixels,
  determining a first distance measurement to the first pixel coordinates,
  determining a second distance measure to the second pixel coordinates,
  determining a sum of the first distance measure and the second distance measure to generate a plurality of distance sums, and
  selecting a greatest distance sum of the plurality of distance sums, the greatest distance sum being associated with a third image element having third pixel coordinates in the connected region of pixels; and
  estimating a fourth location of a fourth image element using a geometric relationship between the first pixel coordinates, the second pixel coordinates, and the third pixel coordinates.

16. The method of claim 13, further comprising:
  converting the image to a binarized image, the binarized image including a plurality of pixels, each pixel of the plurality of pixels being associated with one of a first pixel value or a second pixel value; and
  analyzing the binarized image using one of a connected-component analysis algorithm, a blob extraction algorithm, a region labeling algorithm, a blob discovery algorithm, or a region extraction algorithm to identify the connected region of pixels.

17. A non-transitory computer readable storage medium storing one or more sequences of instructions executable by one or more processors to perform a set of operations comprising:
  obtaining an image of a visual code;
  analyzing the image to determine a connected region of pixels of a plurality of pixels;
  determining a first pixel of the connected region of pixels associated with first pixel coordinates and a second pixel associated with second pixels coordinates;
  determine an area of the image that includes the visual code based at least in part on the first pixel coordinates and the second pixel coordinates;
  determining a plurality of borders associated with the area;
  analyzing the plurality of borders using a first verification test and a second verification test; and
  verifying the area includes the visual code based at least in part on the first verification test and the second verification test.

18. The non-transitory computer readable storage medium of claim 17, further comprising instructions executed by the one or more processors to perform the set of operations of:
  for each pixel in the connected region of pixels,
  determining a distance measurement to each pixel in the connected region of pixels to generate a plurality of distance measurements; and
  selecting a pair of pixels associated with a greatest distance measurement from the plurality of distance measurements.

19. The non-transitory computer readable storage medium of claim 17, further comprising instructions executed by the one or more processors to perform the set of operations of:
  for each image element in the connected region of pixels,
  determining a first distance measurement to the first pixel coordinates,
  determining a second distance measure to the second pixel coordinates,
  determining a sum of the first distance measure and the second distance measure to generate a plurality of distance sums, and
  selecting a greatest distance sum of the plurality of distance sums, the greatest distance sum being associated with a third image element having a third pixel coordinates in the connected region of pixels; and
  estimating a fourth location of a fourth image element using a geometric relationship between the first pixel coordinates, the second pixel coordinates, and the third pixel coordinates.

20. The non-transitory computer readable storage medium of claim 17, further comprising instructions executed by the one or more processors to perform the set of operations of:
  decoding the visual code.

* * * * *